Patented Sept. 30, 1952

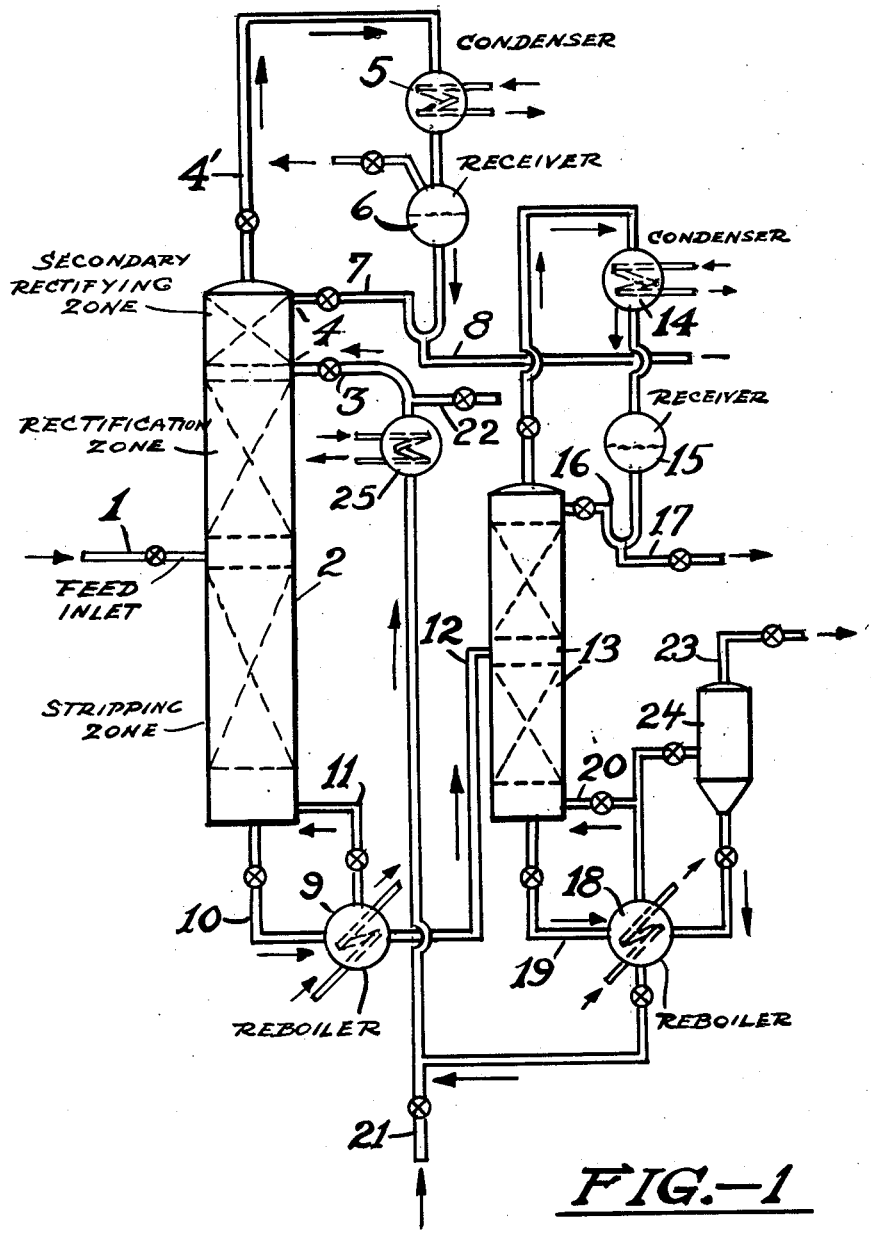
FIG.—1

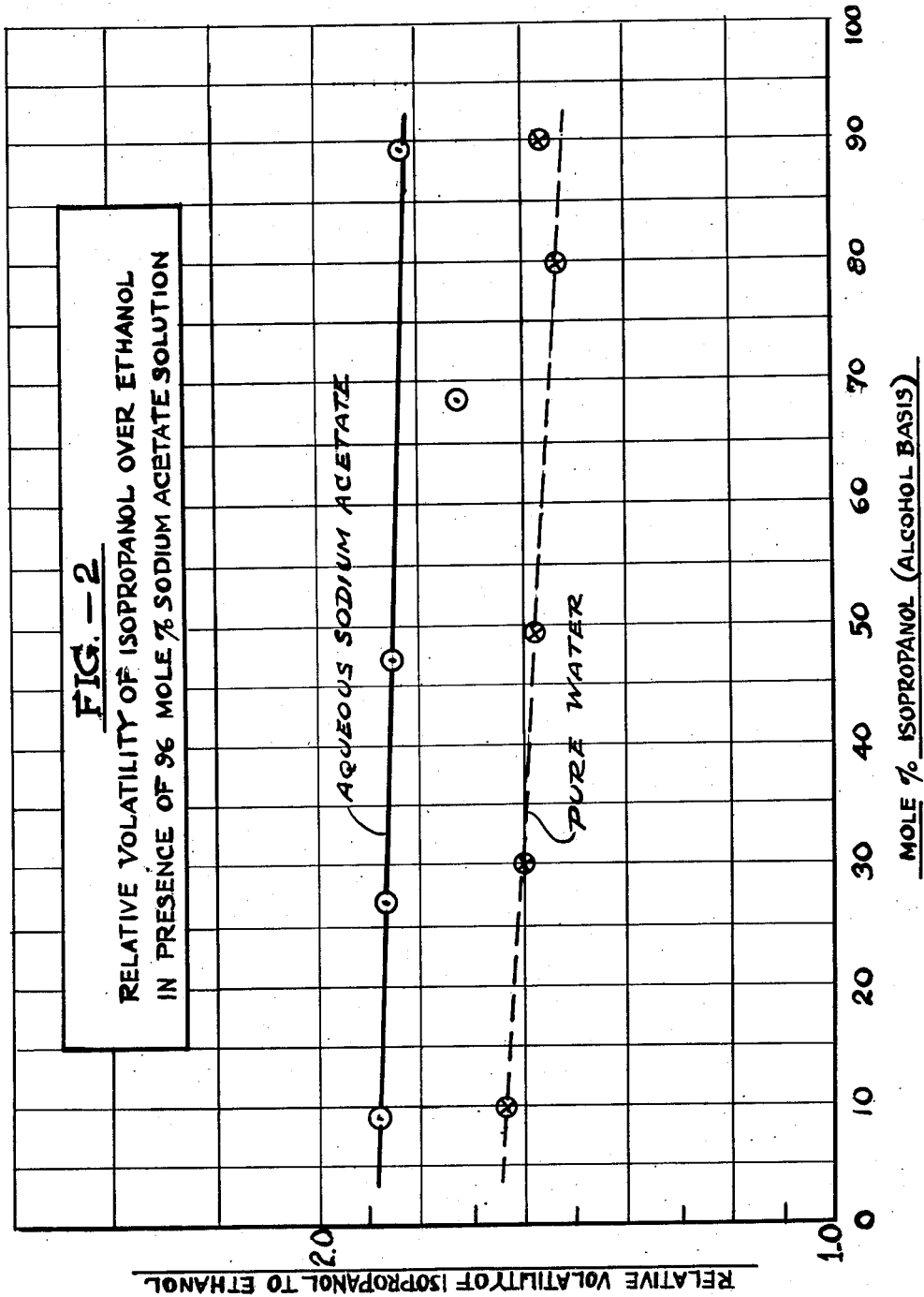

2,612,468

UNITED STATES PATENT OFFICE 2,612,468

EXTRACTIVE DISTILLATION WITH SALT SOLUTIONS

Charles E. Morrell, Westfield, N. J., and Edwin R. Gilliland, Arlington, Mass., assignors to Standard Oil Development Company, a corporation of Delaware Application November 4, 1947, Serial No. 783,989

14 Claims. (Cl. 202—39.5)

1

This invention relates to an improved method for separating aqueous mixtures of oxy organic compounds, particularly those which form close-boiling azeotropes with water. The invention has particular application to the separation of aqueous solutions of low molecular weight oxy organic compounds having less than about 9 carbon atoms per molecule such as the alcohols of 2 or more carbon atoms per molecule and the carbonyl-containing compounds (aldehydes, ketones, esters, acetals, ketals, ethers, etc.) of about 2 to 8 carbon atoms per molecule. The separation is accomplished by distilling such mixtures and passing the vapors countercurrent to a large volume of an aqueous reflux stream containing an electrolyte dissolved therein.

There is described in a copending application, S. N. 724,840, filed January 28, 1947, by Gilliland, Morrell, Carlson and Robertson, of which the present application is a continuation-in-part, now U. S. Patent 2,551,593, a process for separating such aqueous mixtures by distillation in which the vapors are passed countercurrent to a reflux stream containing a high proportion of water. For example, a mixture of ethanol and isopropanol is distilled in a tower while passing downwardly through the tower sufficient water to maintain a concentration of more than 60, and preferably 90 to 97 mol percent of water on the plates of the tower. Under such distillation conditions the volatility of isopropyl alcohol is increased relative to that of ethyl alcohol and substantial separation is obtained with isopropyl alcohol being concentrated in the distillate and ethyl alcohol being concentrated in the tower bottoms, both concentrations being relative to the total alcohol basis in the feed. Both the isopropyl alcohol distillate and the ethyl alcohol bottoms are obtained as aqueous solutions, from which the alcohols may be readily distilled by ordinary methods. Operating in this manner, ethyl alcohol and isopropyl alcohol can be separated to any extent practically desirable so that either alcohol can be obtained in pure form with only traces (0.1% and even less) of the other. The process of this application is also applicable to the separation of one or both of these alcohols from higher-boiling alcohols, from aldehydes, ketones and their condensation products such as the acetals and ketals, etc.

It has been found that this process is improved by the addition of an electrolyte to the water reflux in the distillation tower in which the separation of alcohols, etc., is carried out. The operation is otherwise the same as described in S. N. 724,840 mentioned above. The addition of such electrolytes has been found to change the relative volatility, or "alpha," of the compounds undergoing separations as described above. Such electrolytes include the water-soluble salts which are inert to or react very slowly under the conditions of operation in boiling dilute aqueous solutions with the oxy organic compounds undergoing separation and which are substantially stable under such conditions. Any salts meeting these requirements may be used in accordance with this invention, including those which form weak, reversible complexes with one or more of the oxy organic compounds. Suitable salts include those of alkali and alkaline earth metals, ammonium, magnesium, copper, iron, cobalt, nickel and the like with acid radicals including the halides, phosphates, sulphates, carbonates, nitrates, borates, silicates, chromates and the like. In an even broader sense it is intended to include such salts of acids derived from the various oxides (real or hypothetical) of boron, carbon, nitrogen, sulfur, phosphorous, silicon, chlorine, bromine, iodine and chromium. Similar salts of organic acids may also be used such as those of acetic, benzoic, citric, formic and lactic acids and the like. All these salts include those in which only part of the acidic component has been neutralized, commonly known as metal acid salts; e. g., the sodium acid phosphates. It is recognized that the salts mentioned above vary widely as regards water solubility, stability in boiling salt solutions, reactivity toward some organic compounds and tendency to attack materials of construction of various types. As a result of these differences, the salts should be selected with regard to the chemical nature of the oxy organic compounds to be separated, the distillation conditions of temperature and pressure, and the corrosivity of the materials of construction used in the tower and other equipment. The following general principles should be considered in selecting appropriate salts for any separations desired.

The water solubility of the salt is of considerable importance. In general, it is desired that it be sufficiently water-soluble to produce a finite lowering of the vapor pressure of water in a saturated solution, since one of the purposes of this invention is to provide for lower water vapor content of the gas phase in the extractive distillation zone. This solubility requirement renders such compounds as the alkaline earth normal sulfates and phosphates of little interest. It is also desirable that the water solubility of the salt be sufficiently high for it to dissolve in the mixture of water and oxy organic compounds to be separated, to an extent sufficient to produce two phases, one rich in the oxy organic compounds and the other rich in water. However, in the operation of the process of this invention, it is most desirable to conduct the extractive distillation operation in such a manner that such salting-out phenomena do not occur and that for the lowest temperature in the extractive distillation zone, the salt concentration is just below the value necessary to produce phase separation. In other words, the salt concentration should be low enough so that only one liquid phase is present on the distillation tower plates. Salt concentrations appreciably lower than this value may of course be used, but in general do not provide as effective results as regards enhancement of separation coefficients of the oxy organic materials being distilled and as regards minimizing the water content of the vapor in the extractive distillation zone. In the separation of the higher molecular weight oxy organic compounds, it is desirable to use those salts which exhibit high molal solubilities in water without producing insolubility of the oxy organic compounds. The higher molecular weight oxy organic compounds in the range described above are, of course, of limited solubility in water. Hence, permissible salt concentrations are generally lower than those in the case of the lower oxy organic compounds.

The question of stability of the salt is also of considerable importance, since in general in extractive distillation operations the salt solution must be subjected to boiling both for the purpose of obtaining vaporization of the oxy organic compounds and for adjusting the concentration of the resulting solution obtained as distillation residue. In general, salts which decompose by hydrolysis to form precipitates or which change structure as the result of evolution of their acidic or basic components as gases from boiling aqueous solutions, are not very suitable for use in this operation. Examples of this type are the bicarbonates of the alkali metals which decompose with evolution of carbon dioxide to form precipitates. Other illustrations are the bisulfites of the alkali metals which evolve acid gases under boiling conditions.

Freedom from destructive and irreversible reactivity with the oxy organic compounds present in the extractive distillation zone is obviously of considerable importance. In this respect the salts may have two more or less dependent effects. In the first place, they may react directly with certain of the oxygenated compounds such as the aldehydes or ketones or acids to produce other materials. In this connection, when dealing with mixtures of oxy organic compounds containing aldehydes, ketones or alcohols, it is desired to avoid salts possessing vigorous oxidizing properties. This requirement sometimes renders the nitrates, chlorates and chromates of doubtful practical value in the separation of such mixtures. In the second place, salt solutions may in certain cases act as catalysts to promote reactions between various oxy organic compounds. A typical reaction of this type is that of aldol condensation, which may involve the interaction of one or more molecules of a ketone or the reaction of one or more molecules of an aldehyde or the interaction of aldehydes and ketones. In certain other cases salts may also promote interaction of alcohols and acids to form esters or of alcohols and aldehydes to form acetals. In general, it is desired to eliminate all such combination reactions of the various oxy organic compounds in the extractive distillation zone. Formation of these condensation products results in wide variations of the volatilities of their components and greatly complicates the separations involved. Thus it is often desirable to remove acidic oxy organic compounds from the crude mixtures by solvent extraction, preliminary distillation or neutralization with aqueous alkali prior to the extractive distillation, when the mixture contains acids and alcohols capable of esterification during the distillation.

As applied to the separation of oxy organic compounds from the Fischer synthesis (or hydrocarbon synthesis) products, it is considered that the tendency of the carbonyls (aldehydes and ketones) to undergo aldolization is one of the more important questions limiting the type of salt to be used. It is known that aldol reactions exhibit lowest reaction rates in pH ranges close to 7, both higher and lower pH solutions tending to promote these reactions, the aldehydes being the most reactive and sensitive to change in pH from 7. In the case of oxyorganic compound mixtures containing only alcohols and the less reactive ketones, it is possible to use a fairly wide range of pH on both sides of the neutralization point, from about 3.0 to about 10.0, while with aqueous solutions containing only mixtures of alcohols, a very much wider range of pH can be used without encountering reaction difficulties.

While it is generally desirable in this invention to avoid reactions which are primarily of a condensation type and which result in formation of compounds of higher boiling points than those of the original oxy organic compounds being separated, hydrolytic reactions are permissible and in many cases are desirable. Thus, with feed mixtures containing esters, acetals or ketals, such compounds may be broken down to their elementary building blocks such as the acids, alcohols, aldehydes and ketones. The alcoholic constituents thus formed may then be recovered along with the other alcohols and the carbonyl products along with the uncombined carbonyls originally present in the feed to the extractive distillation.

In working in steel equipment, corrosion of the steel can most readily be avoided by maintaining the salt solutions at a pH of about 8 or higher.

In view of the above, it is possible to point out the preferred types of salts for use in certain special cases and especially for the separation of oxy organic compounds from the aqueous layer obtained in Fischer synthesis reactions. As stated above, it is desirable, in order to avoid corrosion of steel, to maintain a pH of 8 or higher. Furthermore, in order to avoid aldolization in such mixtures, it is desired that this pH range be limited to a maximum value of about 10 to 11. Salts which are especially suited for this control range include those of both partially and completely neutralized acids. Salts of this group which especially meet these requirements are those obtained by partial neutralization of the phosphoric acids. The neutralization of ortho phosphoric acid with approximately 2 molecules of sodium hydroxide per molecule of acid gives a highly satisfactory salt ($Na_2HPO_4$) for this purpose. Sodium sulfate has certain desirable properties in that it gives a pH range of about 7 and does not greatly promote aldolization. Boric acid salts also are useful and have the property that the pH may be varied by partial neutralization of the boric acid. Sodium carbonate is effective when used in proper concentrations in preventing corrosion and is applicable in cases where its relatively high pH does not cause trouble from aldolization, i. e., when distilling mixtures of oxy organic compounds relatively free of aldehydes and ketones.

Mixtures of any of the salts described herein, which do not react to form precipitates or evolve gaseous products under the operating conditions, may also be used to provide both control of pH and enhancement in the relative volatilities of the materials being separated.

The aqueous salt solutions can be used for extractive distillation in accordance with the present invention, to conduct separations of aqueous mixtures containing the following classes of organic compounds: acids, alcohols, ketones, aldehydes, esters, acetals, ketals, ethers and hydrocarbons. The separations can be carried out in the order above indicated, the compounds of one or more classes being separated from those of the latter class or classes in the series. Similarly, mixtures of oxy organic compounds in the same class can also be separated by extractive distillation with aqueous salt solutions according to this invention. In the case of mixtures of isomers of the same class, the volatility of the isomer of higher order is increased relative to the volatility of an isomer of lower order. For example, in the case of alcohols, four different orders may be mentioned: (1) primary normal alcohols, (2) primary branched chain or iso alcohols, (3) secondary alcohols and (4) tertiary alcohols. Isomers of one or more orders of such compounds are thus increased in volatility relative to isomers of the preceding, lower orders. In the case of homologous mixtures of oxy organic compounds (of the same class but differing in molecular weight), the volatility of the compound of higher molecular weight is increased relative to the volatility of the lower molecular weight compound. In the case of separations of compounds falling in the different classes indicated above, the volatility of the compounds in the last named classes is increased relative to the volatility of the compounds in the preceding classes in the series. Thus, the separations can be made between individual compounds in a class or between classes of compounds in the sequence named above. With more complex mixtures, both types of separations occur simultaneously.

The change in the relative volatility of the above types of compounds is effected according to the present invention by distilling mixtures of such compounds in a reflux column in which the reflux liquid is an aqueous salt solution which is used in such proportions as to provide a high molal concentration of water in the liquid phase descending through the distillation zone. In general, increasing the concentration of water in this liquid phase increases the change in relative volatility of the compounds being distilled, but it is recognized that this invention has practical limits where the compounds to be separated are substantially insoluble in water or are substantially involatile. Also, when the compound whose volatility is increased in this process normally boils, when pure or as an aqueous azeotrope, at a temperature lower than that of the other compound or compounds from which it is to be separated, the use of very high aqueous solvent concentrations in the liquid phase of the distillation zone may be necessary to reverse the volatilities of the compounds to be separated. Thus, in dealing with such mixtures it is important for practical purposes that the organic components, which require a reversal in volatility for separation in the present process, distill as pure compounds or azeotropes within a fairly narrow boiling range in order to permit economic tower sizes and water concentrations in the reflux. Generally the molal concentration of solvent in the liquid reflux in the distillation zone is above 50 to 60%, with even higher concentrations causing a still larger change in relative volatilities of the compounds being distilled. For the more difficult separations discussed above, solvent concentrations of 90 to 97%, 98% and even higher may be used. As the solvent concentration approaches infinity the selectivity still increases, but the efficiency is lowered on account of the relatively small quantities of the organic compounds involved. This is not a serious limitation of the present invention, for compounds having widely different boiling points can be readily separated by ordinary distillation methods, the present invention being especially applicable to those mixtures having boiling points so close together that efficient separation by ordinary distillation methods is not practical. An example of such a mixture is the aqueous mixture of ethyl alcohol (aqueous azeotrope, B. P. 78.1° C.) and isopropyl alcohol (aqueous azeotrope, B. P. 80.2° C.). Such alcohols are so close boiling that it is not practical to purify them by ordinary distillation of their mixture, but in the present process the normally higher boiling isopropyl alcohol can be distilled overhead from the ethyl alcohol. Other examples include narrow boiling range mixtures containing the alcohols, oxygenated organic compounds and hydrocarbons of the classes indicated above. Where the crude mixtures obtained boil over a wide range, it is quite feasible to obtain narrow boiling range mixtures desirable for separation by the present invention by conventional distillation.

Some of the above-described mixtures are obtained by an olefin hydration reaction, e. g., when a mixture of ethylene and propylene is absorbed in sulfuric acid, diluted, hydrolyzed, and a resulting aqueous alcohol mixture is stripped out. Another important source of such mixtures is the Fischer synthesis hydrogenation of carbon monoxide, with or without added olefins, especially when the aqueous layer product formed contains not only lower primary and secondary alcohols but also various ketones, aldehydes, ethers, acetals, esters, carboxylic acids, and certain tertiary alcohols. Still another source is in the products of hydrocarbon oxidation where both oil and water layers are obtained, both containing oxygenated organic compounds.

A typical crude ethanol cut obtained from a water layer of a Fischer synthesis process contains the following:

TABLE I

Ethanol cut

| Compounds | Anhydrous B. Pt., °C. | Aqueous Azeotropes B. Pt., °C. |
| --- | --- | --- |
| Methanol | 64.7 | |
| n-Butyraldehyde | 75.7 | 65. |
| Ethyl Acetate | 77.1 | 70.4 |
| Ethyl Alcohol | 78.5 | 78.1 |
| Methyl Ethyl Ketone | 79.6 | 73.6 |
| Isopropyl Alcohol | 82.3 | 80.4 |
| n-Propanol | 97.2 | 87.7 |
| t-Butyl Alcohol | 82.8 | 79.9 |
| Methyl Propyl Ketone | 101.7 | 82.9 |
| Acetal | 103.2 | 82.6 |
| Water | 100.0 | |

Such fractions, distilling in the range between about 20° and 97° C. and containing about 20 to 40 volume per cent of water, are obtained by distillation of the water layer of the product of the Fischer synthesis process for hydrogenation of carbon monoxide.

In such crude ethanol cuts such as those described above, the kinds and quantities of the components vary greatly but the major components are generally ethyl alcohol, isopropyl alcohol, methylethyl ketone and n-butyraldehyde. Repeated fractional distillations of such ethanol cuts were found to be of no avail for obtaining isolation of pure ethyl alcohol or pure isopropyl alcohol. The difficulties encountered can be appreciated by reference to Table I which shows the overlapping of the boiling points and by considering that these compounds form additional azeotropes with one another. With the present invention it was found possible to effect the critical separations necessary in recovering the pure alcohols freed of the other substances normally boiling in the same narrow range, even though the contaminating substances have relatively lower and higher boiling points.

Narrow-boiling range mixtures which may be obtained by the ordinary distillation processes from such crude aqueous products are as follows:

TABLE II

Narrow-boiling range alcohol mixtures

| Group | Components | Normal B. Pt., °C. | Aqueous Azeotrope B. Pt., °C. |
| --- | --- | --- | --- |
| I | Ethyl Alcohol | 78.5 | 78.1 |
| | Isopropyl Alcohol | 82.3 | 80.4 |
| II | Ethyl Alcohol | 78.5 | 78.1 |
| | Isopropyl Alcohol | 82.3 | 80.4 |
| | Methyl Ethyl Ketone | 79.6 | 73.6 |
| III | Ethyl Alcohol | 78.5 | 78.1 |
| | Isopropyl Alcohol | 82.3 | 80.4 |
| | t-Butyl Alcohol | 83.0 | 79.9 |

The narrow-boiling range mixture may be a binary or tertiary mixture, as in the groups shown, but, generally, the crude mixtures contain additional oxygenated organic compounds, which do not interfere with the basic operation of this invention in isolating the principal alcohol components of the mixtures. It is to be noted that the aqueous azeotropes of the alcohols in these mixtures have boiling points which differ by less than five centigrade degrees. It is generally desirable to use such relatively narrow cut mixtures boiling over a range of not more than 5 or 10° C. in the present process, although fractions boiling over a much wider range of 15° C. or more may also be used, as described below.

Examples generally of specific mixtures which can be separated by extractive distillation with aqueous salt solutions according to this invention are as follows:

Any alcohols of 2–6 carbon atoms per molecule can be separated from each other and from carbonyl-containing compounds of 2 to 8 carbon atoms per molecule and hydrocarbons of similar boiling range. The less volatile compound which is obtained in the extractive distillation residue in the following specific separations, is named first:

(1) Ethanol from isopropanol.

(2) Ethanol from isopropanol and the butanols.

(3) Ethanol from isopropanol, the butanols and the amyl alcohols.

(4) Ethanol (with methanol, if present) from all or any one or any combination of the aliphatic alcohols of 3 to 6 carbon atoms per molecule.

(5) Ethanol from methyl ethyl ketone and higher ketones such as methyl normal propyl ketone and methyl normal butyl ketone.

(6) Ethanol from butyraldehyde and the higher aldehydes.

(7) Ethanol from ethyl acetate, acetal and the ketals.

Methanol, if present in any of the initial mixtures (1) to (7) described above, is also obtained in the bottoms.

(8) Isopropanol from the butanols.

(9) Isopropanol from methyl ethyl ketone.

(10) N-propanol (with ethanol and methanol, if present) from all or any one or any combination of the aliphatic alcohols of 4–6 carbon atoms per molecule and from isopropanol.

(11) N-butanol from other C₄ alcohols (secondary butanol, tertiary butanol, isobutanol) and all aliphatic alcohols of 5 and 6 carbon atoms per molecule.

(12) N-butanol from the C₆ aliphatic alcohols.

(13) Isopropanol from all higher alcohols and specifically from all higher secondary and iso-aliphatic alcohols of 4 to 6 carbon atoms per molecule.

(14) Secondary alcohols of 3 to 5 carbon atoms per molecule from all aliphatic alcohols of higher molecular weight of 4 to 6 carbon atoms per molecule.

(15) Isoalkyl alcohols from higher molecular weight isoalkyl alcohols of 3 to 6 carbon atoms per molecule (isobutanol from isoamyl alcohol).

(16) Any one or any combination of the aliphatic alcohols of 2 to 6 carbon atoms per molecule as bottoms from any organic carbonyls and any other oxy organic compounds of the classes described above (ketones, aldehydes, esters, acetals, ketals, and ethers) and any hydrocarbons of 2 to 8 carbon atoms per molecule.

The process may be repeated on the above-described distillate fractions to separate one or more of the first named members from latter named members of each fraction.

The drawing (Figure 1) is a diagrammatical illustration in partial sectional elevation of suitable equipment for carrying out the process of this invention and indicates the flow of materials. It will be described in relation to a specific example of the application of this process to the separation of pure ethanol from a crude ethanol fraction. While the process is applicable directly to the separation of ethanol from the mixtures described in Tables I and II, for simplicity, it will be described with a feed cut of the following composition:

| | Mol per cent |
|---|---|
| Ethyl alcohol | 80 |
| Isopropyl alcohol | 4 |
| Methyl ethyl ketone | 4 |
| Water | 12 |

This crude alcohol mixture is supplied by line 1 to the mid portion of a distillation tower 2 which may be supplied with suitable plates or packing for efficient countercurrent contact of liquid and vapor and which contains the equivalent of about 30 plates below the feed, and 30 plates between the feed and a solvent supply line 3. A water rectifying section 4 containing about 10 plates may also be provided above the solvent supply line and is of value in reducing the water content of the distillate to composition approaching any azeotropes which are obtained.

The top of the tower may also be supplied with any suitable methods for returning reflux thereto from partial or total distillate condensers such as the cooling condenser 5, condensate receiver 6, reflux return line 7 and distillate withdrawal line 8. The bottom of the tower is also supplied with suitable heating means for reboiling the tower bottoms such as the closed steam heater 9 in the tower bottoms line 10 provided with a heated, bottoms vapor return line 11.

The tower bottoms are passed by line 12 to a second distillation column 13 which may be of any suitable design for separating volatile products from liquid under fairly good fractionating conditions. Its function in dealing with the specific feed stock described above is to separate an ethyl alcohol-water azeotrope, with or without additional water as may be desired, from the bottoms leaving tower 2. Tower 13 is provided with any suitable partial or complete distillate condenser for supplying reflux such as the condenser 14, condensate receiver 15, reflux return line 16 and distillate product withdrawal line 17. Tower 13 is also supplied with suitable means for reboiling the tower bottoms such as the heater 18 in the tower bottoms line 19, and the vapor return line 20.

In the operation of the process the solvent leaving tower 13 may be returned to tower 2 by line 3. Lines 21 and 22 may be provided for withdrawal and addition of solvent as desired. A heat exchanger 25 may also be provided in line 3 to adjust the temperature of the solvent returned to tower 2. This is desirable in the event that towers 2 and 13 are operated at different pressures. Since it is generally undesirable to withdraw solvent containing an electrolyte or salt as used in accordance with this invention, and yet the solvent bottoms 10 from tower 2 may tend to become diluted with water from the feed mixture, it is desirable to provide means for withdrawing this dilution water from the solvent before its return in line 3. This may be done by operating towers 2 and/or 13 to take a distillate fraction containing the excess water supplied with the feed. Also, by designing heater 18 with suitable liquid-vapor separators so that only vapor is returned in line 20, any desired portion of the excess water supplied with the feed may be removed as vapor through line 23, which may be provided with a liquid dephlegmator 24 for a return of liquid to the bottoms of tower 13.

The process may be operated with the feed composition described above in the following manner.

*Example 1*

An aqueous salt solution containing 9.73 mol per cent sodium acetate and the balance water, is supplied at a rate of 3680 gallons per hour and at a temperature of 190° F. in line 3 to tower 2 to which the crude alcohol feed mixture is supplied by line 1 at a rate of 650 gallons per hour. The reboiler and reflux condenser are operated to provide a reflux ratio of 15 volumes per volume of feed in section 4, thus giving a distillate containing about 11% water, which approaches the water content of the aqueous azeotropes taken overhead. The solvent returned in line 3 is in such quantity to provide a proportion of solvent to oxyorganic compounds on the plates throughout tower 2 below the solvent line 3 of about 85 to 95 mol per cent solvent (sodium acetate plus water). Under these conditions, in operating for the production of ethyl alcohol of high purity, a small proportion of ethyl alcohol may be taken overhead in order to insure the thorough removal of isopropyl alcohol and methyl ethyl ketone at this point, thus providing a distillate in line 8 of the following composition:

| | Mol per cent |
|---|---|
| Methyl ethyl ketone | 40.4 |
| Isopropyl alcohol | 40.4 |
| Ethyl alcohol | 8.1 |
| Water | 11.1 |

The bottoms from tower 2 in line 12 are thus a dilute solution of ethyl alcohol in aqueous sodium acetate free of all but minute traces of higher alcohols and ketones. Under these conditions tower 13 may be operated as a simple ethanol still to produce the aqueous ethanol azeotrope (96 volume per cent ethanol) as the distillate in line 17. This ethyl alcohol is of extremely high purity and good odor and contains only traces not exceeding 0.1% of other organic compounds.

*Example 2*

A feed mixture containing 80 mol per cent ethanol, 4 per cent methyl ethyl ketone, 4 per cent isopropanol and 12 per cent water, was supplied at 30° C. at a rate of 106 volumes per hour to the mid-point of a packed column equivalent to 50 theoretical plates equipped with a solvent supply line and a vapor reflux condenser at the top and heating means at the bottom.

An aqueous solution of 33 weight per cent sodium acetate was supplied as solvent at a temperature of 94° C. and a rate of 1940 volumes per hour to the top of this column. The vapors leaving the top of the column were passed through a reflux condenser from which reflux condensate was returned to the column at a reflux ratio of 20 to 1 based on the liquid distillate removed from the column. The liquid phase in the top of the column thus contained 92 mol per cent of solvent which was supplied to the column at a ratio of 1300 mols of total solvent (water plus salt) per 100 mols of total feed mixture. The liquid bottoms leaving this column were passed to a second column from which aqueous ethanol was removed as distillate. 93.5% of the ethanol in the feed mixture was recovered in this second distillate product which on analysis was found to be free of methyl ethyl ketone as indicated by a sensitive qualitative test demonstrating the entire absence of carbonyls. The second distillate product contained 0% isopropanol.

*Example 3*

The water layer of a hydrocarbon synthesis product (from carbon monoxide and hydrogen) was distilled and the following fraction was obtained:

| | Per cent by volume |
|---|---|
| Ethanol | 66 |
| Methanol | 7 |
| I PrOH | 1 |
| Acetone | 9 |
| MEK | 4 |
| Butyraldehyde | 3 |
| Esters | 1 |
| Water | 9 |
| | 100 |

This mixture was subjected to extractive distillation with the same aqueous sodium acetate solvent in the same column and under the same operating conditions as described above in Example 2. The residue from this column was also distilled in a second column to separate the feed components remaining therein from the aqueous sodium acetate. The resulting aqueous alcohol distillate from the second column contained ethanol and methanol and was found by sensitive analysis to be entirely free of both aldehydes and ketones. Its isopropanol content also was 0%.

The following examples are also presented to illustrate the advantages in the use of aqueous salt solutions as the solvent in the extractive distillation processes of this invention. These examples involve the determination of the relative volatility of isopropyl alcohol to ethyl alcohol in the presence of indicated amounts of solvent. This was done by distilling the mixture under total reflux return conditions in an equilibrium still and making analyses of the reflux condensate (vapor sample) and the still content (liquid sample) at equilibrium conditions. The relative volatility thus determined is the volatility of one component divided by that of the other, the volatility of each component being proportional to its partial pressure divided by its mol fraction in the liquid phase. This is also defined by the equation Alpha $= (y_1/y_2)/(x_1/x_2)$, where $x$ refers to the liquid phase mol fractions of the components to be separated, $y$ refers to the vapor phase mol fraction of these components, subscript one designates the more volatile component and subscript two the less volatile component.

Since the relative volatility varies with the proportion of ethanol to isopropanol, it was determined over a wide range both with pure water as the solvent and with aqueous sodium acetate (9.73 mol per cent sodium acetate, balance water). The data, presented in Figure 2, indicate the increase in relative volatility of isopropanol to ethanol obtained by using sodium acetate. This increase in relative volatility is of great practical value as it simplifies the distillation problem, permitting the use of smaller distillation towers and a smaller number of plates in order to accomplish the separation.

Data showing the relative volatility obtained with various aqueous solutions of other salts are presented in the following Table III which also indicates the reduction in the concentration of water in the vapor phase when distilling the aqueous alcohol mixture from such a salt solution.

TABLE III

*Effect of salts on vapor liquid equilibria*

[Liquid composition (salt free) in all cases 90-5-5 mol percent water isopropanol and ethanol, respectively.]

| Salt | Mols Salt per Liter of Solution | Relative Volatility Isopropanol to Ethanol | Mol Fraction H$_2$O in Vapor |
|---|---|---|---|
| None | | 1.5 | 0.55 |
| LiCl | 15 | 2.2 | 0.23 |
| LiNO$_3$ | 21 | 2.1 | 0.28 |
| MgCl$_2$ | 5 | 2.1 | 0.25 |
| MgCl$_2$ | 4.0 | 2.0 | 0.3 |
| MgCl$_2$ | 3.0 | 1.9 | 0.35 |
| Mg(NO$_3$)$_2$ | 3.7 | 1.9 | 0.35 |
| NaI | 10 | 1.9 | 0.35 |
| NiCl$_2$ | 4.1 | 1.85 | 0.35 |
| FeCl$_2$ | 3.9 | 1.85 | 0.35 |
| CaCl$_2$ | 4.5 | 1.85 | 0.28 |
| Ca(NO$_3$)$_2$ | 5.2 | 1.8 | 0.36 |
| NH$_4$NO$_3$ | 18 | 1.7 | 0.38 |
| CuCl$_2$ | 4.5 | 1.7 | 0.43 |
| BaCl$_2$ | 1.4 | 1.6 | 0.42 |
| NaOH | 2.0 | 1.6 | 0.4 |
| Mg(Ac)$_2$ | 5.7 | 1.5 | 0.43 |
| MgSO$_4$ | 0.7 | 1.5 | 0.48 |
| KNO$_3$ | 4.4 | 1.5 | 0.42 |
| KNO$_2$ | 4.2 | 1.5 | 0.37 |
| NH$_4$H$_2$PO$_4$ | 1.9 | 1.4 | 0.49 |

Sodium acetate and disodium acid phosphate (Na$_2$HPO$_4$) have been found to be particularly effective salts both for increasing the relative volatility of isopropanol to ethanol, for reducing the water content of the vapor and for resisting corrosion to steel. More complete data on equilibrium still determinations with these salts are presented below in Tables IV and V:

TABLE IV

*Relative volatility of isopropanol over ethanol in presence of aqueous sodium acetate solution*

Mol percent H$_2$O ........................................ 85.76
Mol percent NaOAc ....................................... 9.24
pH ............................................................... 8.4

| Run No. | 1 | 2 | 3 | 4 | 5 |
|---|---|---|---|---|---|
| Charge: | | | | | |
| Mol percent EtOH } Alcohol basis | 90 | 70 | 50 | 30 | 10 |
| Mol percent IpOH } | 10 | 30 | 50 | 70 | 90 |
| Vapor Sample: | | | | | |
| Mol percent EtOH } Alcohol basis | 84.2 | 58.9 | 37.5 | 21.4 | 5.9 |
| Mol percent IpOH } | 15.8 | 41.1 | 62.5 | 78.6 | 94.1 |
| Mol percent H$_2$O | 40.3 | 38.2 | 31.7 | 34.5 | 36.8 |
| Liquid Sample: | | | | | |
| Mol percent EtOH } Alcohol basis | 90.9 | 72.9 | 52.9 | 31.8 | 10.4 |
| Mol percent IpOH } | 9.1 | 27.1 | 47.1 | 68.2 | 89.6 |
| Mol percent H$_2$O | 86.5 | 86.5 | 86.5 | 86.4 | 86.4 |
| Mol percent NaOAc | 9.40 | 9.38 | 9.36 | 9.36 | 9.36 |
| Liquid Temperature, °C | 89.0 | 87.1 | 85.5 | 83.9 | 83.0 |
| Barometer, mm. Hg | 755 | 748 | 752 | 752 | 768 |
| Relative Volatility of Isopropanol over Ethanol | 1.88 | 1.87 | 1.87 | 1.72 | 1.85 |

TABLE V

*Relative volatility of isopropanol to ethanol in presence of aqueous $Na_2HPO_4$ solution*

Mole percent $H_2O$ ---- 93.31
Mole percent $Na_2HPO_4$ ---- 1.69

| Run | 1 | 2 | 3 | 4 | 5 |
|---|---|---|---|---|---|
| Charge: | | | | | |
| Mole percent IpOH } Alcohol Basis | 10 | 30 | 50 | 80 | 90 |
| Mole percent EtOH } | 90 | 70 | 50 | 20 | 10 |
| Vapor Sample: | | | | | |
| Mole percent $H_2O$ | 50 | 47 | 56 | 40 | 37 |
| Mole percent IpOH } Alcohol Basis | 15.4 | 41.1 | 56.9 | 83.4 | 93.8 |
| Mole percent EtOH } | 84.6 | 58.9 | 43.1 | 16.6 | 6.2 |
| Liquid Sample: | | | | | |
| Mole percent $H_2O$ | 96 | 96 | 96 | 96 | 96 |
| Mole percent IpOH } Alcohol Basis | 8.6 | 28.4 | 44.1 | 74.4 | 89.8 |
| Mole percent EtOH } | 91.4 | 71.6 | 55.9 | 25.6 | 10.2 |
| Relative Volatility ($\alpha$) Isopropanol to Ethanol | 1.93 | 1.76 | 1.68 | 1.73 | 1.72 |

Sodium carbonate in 0.95 mol per cent in water, when used in distilling a mixture of 4 mols isopropanol to 1 mol ethanol with 90 mol per cent solvent, gave a relative volatility of isopropanol to ethanol of 1.53. The same salt at 1.52 mol per cent concentration in 95 mol per cent solvent, when used in distilling the same alcohol mixture, gave a relative volatility of isopropanol to ethanol of 1.55.

Sodium sulfate in 1.4 mol per cent concentration in solvent, when using 95 mol per cent solvent in distilling the same alcohol mixture, gave a relative volatility of isopropanol to ethanol of 1.74.

A mixture of phosphoric acid and caustic soda, giving an empirical formula $(Na_3H_3(PO_4)_2)_{0.5}$, when used in 1.53 mol per cent concentration in aqueous solvent at 90 mol per cent solvent, in distilling mixtures of ethanol and isopropanol ranging from 90% ethanol to 90% isopropanol, gave relative volatilities of isopropanol to ethanol ranging, respectively, from 1.63 to 1.45.

Ammonium chloride used in 1.53 mol per cent concentration in water with 90 mol per cent solvent, in distilling the same range of mixtures of ethanol and isopropanol, gave relative volatilities of isopropanol to ethanol ranging, respectively, from 1.73 to 1.41.

While the above examples illustrate changes in the distillation characteristics of aqueous ethanol-isopropanol mixtures caused by the use of the present invention, the invention is also applicable to separation of other close-boiling organic mixtures. For example, other alcohols of 2 to about 6 carbon atoms per molecule such as normal propanol, normal, secondary, tertiary and iso butanols and the primary, secondary, tertiary and iso pentanols and hexanols may also be separated by similar distillation methods according to the above described invention. Close-boiling fractions boiling within the range of about 15° and preferably about 10 to 5° C., containing other classes of oxy organic compounds such as the aldehydes, ketones, esters, acetals and ketals of about 4 to 8 carbon atoms per molecule, and hydrocarbons of similar boiling range, may also be separated into classes in the sequence named and into individual compounds in the order of increasing molecular weight of homologues and of increasing order of isomers by the same methods.

We claim:

1. The method of separating water-miscible aliphatic alcohols having 2 to 6 carbon atoms per molecule and which form close-boiling aqueous azeotropes difficult to separate by ordinary fractional distillation in having boiling points which differ by less than 5° C., one of said alcohols having a higher molecular weight than the other, which comprises continuously introducing a feed mixture of said alcohols to a fractional distillation zone wherein vapors of said alcohols with water vapor ascend countercurrently to liquid reflux of the alcohols dissolved in a sufficiently higher proportion of an aqueous salt solution to effect vaporization of a larger part of the higher molecular weight alcohol than of the other alcohol in said reflux, continuously introducing an aqueous salt solution at an upper part of the fractional distillation zone to maintain at least 60 mole per cent water in said liquid reflux and to maintain 1 to 10 mole per cent salt in the water content of the liquid reflux, continuously removing vapor of the higher molecular weight alcohol with water vapor overhead from the fractional distillation zone, and removing a dilute aqueous salt solution of the other alcohol as bottoms from the fraction distillation zone.

2. A process of separating a water-miscible aliphatic alcohol having 2 to 6 carbon atoms per molecule from a mixture containing higher molecular weight oxygenated aliphatic organic compound of the class consisting of ketones, aldehydes, esters, ethers, ketals, and acetals which have 2 to 8 carbon atoms per molecule and which are difficult to separate from the alcohol by ordinary fractional distillation, which comprises continuously introducing a feed mixture of the alcohol and said higher molecular weight oxygenated aliphatic organic compound to a fractionation zone wherein vapors of the feed mixture with water vapor ascend countercurrently in contact with liquid reflux of condensate from said vapors, increasing the water content of condensates at an upper part of the fractionation zone by introducing an aqueous salt solution continuously thereto so that the liquid reflux contains at least 60 mole per cent water with about 1 to 10 mole per cent salt dissolved therein to thereby increase the relative volatility of said higher molecular weight oxygenated organic compound relative to the volatility of lower molecular weight alcohol present in the feed mixture, continuously removing overhead from said fractional distillation zone vapor of said other higher molecular weight oxygenated organic compound with water vapor, and continuously withdrawing from a bottom part of the fractionation zone a residual dilute aqueous salt solution containing the lower molecular weight alcohol component from the feed mixture substantially freed of said higher molecular weight oxygenated organic component.

3. The method of separating ethyl alcohol from isopropyl alcohol which comprises continuously introducing a feed mixture of said alcohols to a fractional distillation zone wherein vapors of said alcohols with water vapor ascend countercurrently to a liquid reflux which contains condensates of said alcohols dissolved in an aqueous salt solution, supplying an aqueous salt solution to an upper part of said fractional distillation zone above its feed level to provide certain liquid reflux with a water content of more than 60 mole per cent and to make the water of the liquid reflux contain from about 1 to 10 mole per cent salt, thereby effecting vaporization of a larger part of the isopropyl alcohol than of the ethyl alcohol present in the liquid reflux, withdrawing overhead from the fractional distillation zone vapors of water mixed with alcohol vapors that are enriched by isopropyl alcohol with respect to the feed mixture, flowing said liquid reflux through a stripping zone in a lower part of the fractionation zone countercurrently in contact with vapors evolved from the liquid reflux, and withdrawing from a bottom part of the stripping zone a dilute aqueous salt solution containing ethanol substantially freed of isopropanol.

4. A method according to claim 3 in which said salt is a sodium salt.

5. A method according to claim 3 in which said salt is a sodium acetate.

6. A method according to claim 3 in which said salt is a lithium salt.

7. A method according to claim 3 in which said salt is lithium chloride.

8. A method according to claim 3 in which said salt is a magnesium salt.

9. A method according to claim 3 in which said salt is magnesium chloride.

10. The method of separating a lower molecular weight aliphatic alcohol having less than 6 carbon atoms per molecule from a mixture thereof with a higher molecular weight alcohol having 2 to 6 carbon atoms per molecule and a higher molecular weight aliphatic carbonyl compound having 2 to 8 carbon atoms per molecule, said alcohols and carbonyl compound forming close-boiling azeotropes difficult to separate by ordinary fractional distillation in having boiling points which differ by less than 5° C., which comprises heating an aqueous salt solution of said mixture in a first fractionation zone to evolve vapor therefrom, passing an aqueous salt solution downwardly through said fractionation zone countercurrently to said evolved vapors to maintain in refluxing liquid phases existing throughout said fractionation zone above about 85 mole per cent water with 1 to 10 mole per cent salt dissolved in the water, withdrawing a vapor stream containing water vapor mixed with an enhanced proportion of higher molecular weight alcohol and carbonyl compound with respect to the lower molecular weight alcohol in the feed mixture, and withdrawing from a bottom part of said fractionation zone a dilute aqueous salt solution enhanced in the proportion of the lower molecular weight alcohol with respect to the higher molecular weight alcohol and carbonyl compound present in the feed mixture composition.

11. The process according to claim 10, in which said dilute aqueous salt solution withdrawn from the bottom of the fractionation zone is passed to a second distillation zone, and the lower molecular weight alcohol is distilled from the aqueous salt solution substantially free of higher molecular weight organic components present in the feed mixture.

12. The process according to claim 10, in which salt solution residue from said second distillation zone is returned to an upper part of the first fractionation zone.

13. The process according to claim 10, in which vapors rising from the first fractionation zone pass upwardly through a second rectification zone countercurrent to descending liquid reflux containing condensate of vapors leaving the top of second rectification zone, and in which distillate obtained from the rectification zone is thus reduced in water content to a composition approximating that of aqueous azeotrope of organic compounds passed upwardly through the second rectification zone.

14. A process according to claim 4 in which said sodium salt is disodium hydrogen phosphate.

CHARLES E. MORRELL.
EDWIN R. GILLILAND.

REFERENCES CITED

The following references are of record in the file of this patent:

UNITED STATES PATENTS

| Number | Name | Date |
|---|---|---|
| 893,784 | Chute | July 21, 1908 |
| 1,911,832 | Lewis | May 30, 1933 |
| 1,982,988 | Gorham | Dec. 4, 1934 |
| 2,022,274 | Brooks | Nov. 26, 1935 |
| 2,081,189 | Weizevich | May 25, 1937 |
| 2,179,991 | Bright et al. | Nov. 14, 1939 |
| 2,290,442 | Metzl | July 21, 1942 |